Patented Sept. 15, 1953

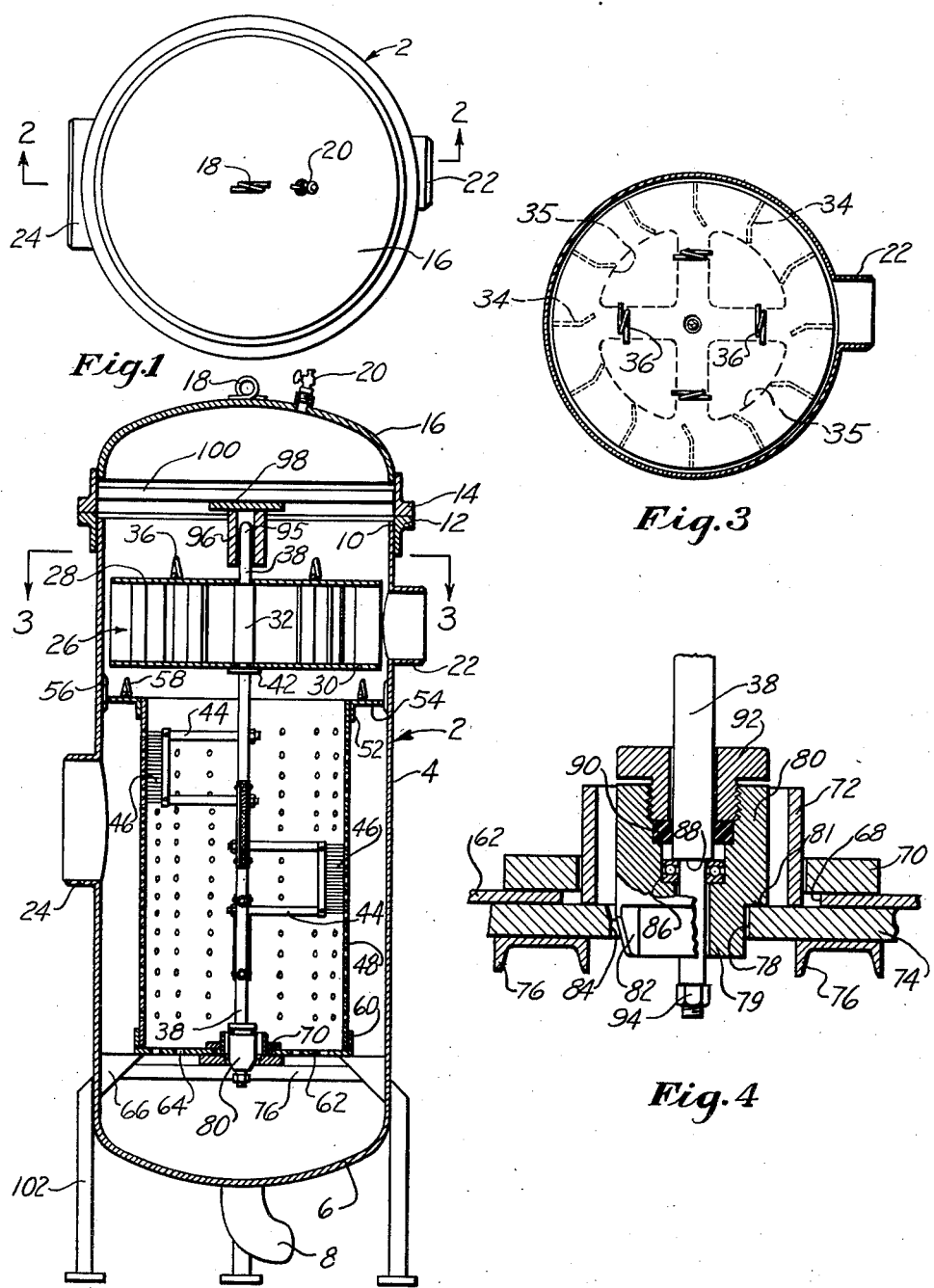

2,652,153

UNITED STATES PATENT OFFICE 2,652,153

PIPE LINE STRAINER

Ainslie Perrault, Tulsa, Okla., assignor to
Jackson L. Culbertson, Tulsa, Okla.

Application September 2, 1950, Serial No. 182,984

1 Claim. (Cl. 210—167)

This invention relates to a pipe line strainer and more particularly, but not by way of limitation, to a self-cleaning pipe line strainer for the purpose of protecting line pumps, turbines, and the like, from injury due to debris present in the fluid flowing thereto.

It is well known that in fluid pipe lines for any purpose for the transportation of oil, water, gas or the like, that debris of all kinds, such as wax, grass, leaves, rocks, sand and gravel is usually present in the fluid flowing through the pipe lines, and if allowed to come in contact with a pump or turbine will have an injurious effect thereon. The present invention is generally concerned with a self-cleaning strainer apparatus adapted to be interposed in a flow line for removing debris from the fluid moving through the pipe or flow line for the purpose of cleaning the fluid.

It is an important object of this invention to provide a pipe line strainer for catching any debris flowing in the pipe line, and which automatically cleans the strainer to prevent any clogging thereof, and a consequent plugging of the pipe line.

And still another object of this invention is to provide a pipe line strainer having an automatic wiping means for the strainer actuated by the fluid passing through the strainer in order to maintain the strainer substantially free of debris at all times.

And still another object of this invention is to provide a pipe line strainer adapted to be interposed in a flow line and having a power wheel communicating with the fluid for causing actuation of a cleaning means for maintaining the strainer in unclogged condition.

And still another object of this invention is to provide a pipe line strainer interposed in a flow line wherein the inlet fluid immediately prior to discharge into the strainer is increased in velocity to actuate a power wheel, which in turn rotates a sweep cleaning means for maintaining the strainer in unclogged condition, and simultaneously decreases the fluid velocity to permit heavier debris to fall by gravity to the bottom of the strainer.

And still another object of this invention is to provide a pipe line strainer interposed in a flow line wherein the inlet fluid, immediately prior to discharge into the strainer is increased in velocity in order to keep the entrance to the strainer free of any debris in the line, while assisting gravitation of the debris to the bottom of the removable strainer, thereby preventing possible injury to pumps or turbines communicating with the flow line.

Other objects and advantages of the invention will be evident from the following detailed description, read in conjunction with the accompanying drawings, which illustrate my invention.

In the drawings:

Figure 1 is a plan view of a novel pipe line strainer.

Figure 2 is a vertical sectional view taken essentially on line 2—2 of Figure 1.

Figure 3 is a sectional view taken on line 3—3 of Figure 2.

Figure 4 is a sectional detail of the lower bearing.

Referring to the drawings in detail, and particularly Fig. 2, reference character 2 designates a novel pipe line strainer having an essentially cylindrical body portion 4. The body 4 has its lower end enclosed and rounded as at 6, but has a suitable drain line 8 communicating with any desired disposal such as a sump pit (not shown). The drain line 8 preferably has a suitable valve (not shown) interposed therein to control the draining of the strainer 2 as will be hereinafter set forth. The upper end 10 of the body 4 is open and is provided with a circumferential flange 12 adapted to mate with a companion flange 14 secured to the lower end of a cap or bonnet 16. The cap 16 has a suitable lifting eye 18 to facilitate the handling thereof, and a gas bleed valve 20. A suitable relief valve (not shown) may also be provided in the cap 16 to preclude excessive pressures being developed in the strainer 2 if desired.

An inlet nozzle 22 is provided in the upper portion of the body 4 having its center line offset from the vertical center line of the body 4 as clearly shown in Figs. 1 and 3. An outlet nozzle 24 is also provided in the body 4 essentially diametrically opposite, but below the inlet 22. It will be apparent that the outlet nozzle 24 is substantially twice as large as the inlet nozzle 22 for purposes as will be hereinafter set forth.

A rotatable power wheel 26 (Figs. 2 and 3) is provided in the body 4 directly opposite the inlet nozzle 22. The power wheel 26 has a pair of vertically spaced circular plates 28 and 30 interconnected at their centers by a pipe or the like 32. Each of the plates 28 and 30 is apertured to receive the opposite ends of the pipe 32. A plurality of circumferentially spaced blades or vanes 34 are secured between the plates 28 and 30. The blades 34 may be bent as shown in Fig. 3, or curved (not shown), in order that fluid entering the body 4 through the inlet 22 will strike the blades 34 and rotate the power wheel 26. The lower plate 30 is partially cut away at 35 as shown in dotted lines in Fig. 3 for allowing fluid, after contacting the blades 34, to fall by gravity into the lower portion of the body 4. The upper plate 28 is provided with a pair of lifting eyes 36 to facilitate the handling of the power wheel 26.

A vertically disposed shaft 38 extends through the plates 28 and 30 and the pipe 32. The power wheel 26 is suitably keyed (not shown) to the shaft 38 to cause rotation of the shaft 38 upon rotation of the power wheel 26. In addition, a circumferential shoulder (not shown) is provided on the shaft 38 below the plate 30 to support a suitable washer 42 in contact with the plate 30, thereby supporting the power wheel 26 on the shaft 38 in the correct vertical position.

A plurality of radially disposed arms 44 are secured to the shaft 38 below the power wheel 26. The arms 44 are provided in pairs, and each successive pair is disposed at an angle of approximately ninety degrees from the adjacent upper pair. Each pair of arms 44 supports a suitable wire brush 46, and the arms 44 are vertically spaced in such a manner that the brushes 46 slightly overlap for purposes as will be hereinafter set forth. Although four brushes 46 are shown, it will be readily appreciated that the number may vary with the size of the strainer 2, and the invention is not limited to any specific number.

The brushes 46 contact the interior surface of a cylindrically shaped strainer basket 48 having a slightly smaller diameter than the body 4. The basket 48 is preferably made from wire mesh or a perforated plate, depending upon the degree of filtration required. A suitable band (not shown) may be provided around the central portion of the basket 48 for additional support if desired. The upper end of the basket 48 is secured to a depending circumferential flange 52 of an annular plate 54. A plurality of circumferentially spaced key nibs 56 are provided on the interior of the body 4 adapted to cooperate with complementary keyways (not shown) in the outer edge of the plate 54 to retain the basket 48 in a fixed angular position during operation of the strainer 2. The plate 54 is provided with a pair of lifting eyes 58 to facilitate the insertion and removal of the basket 48.

The lower end of the basket 48 is secured to the upwardly extending circumferential flange 60 of a circular shaped bottom plate 62. The bottom plate 62 is provided with a plurality of apertures 64 for purposes as will be hereinafter set forth. The plate 62 and the basket 48 are supported by a plurality of brackets 66 secured in the lower portion of the body 4. An enlarged aperture 68 is provided in the center of the plate 62, and an annular guide plate 70 is secured on the upper surface of the plate 62 concentric with the aperture 68.

As clearly shown in Fig. 4, the aperture 68 receives the upwardly extending flange 72 of base plate 74. The base plate 74 is secured to a pair of supporting channels 76 provided in the lower portion of the body 4. An aperture 78 is provided in the center of the base plate 74 to receive the lower end 79 of a bearing housing 80. The lower end 79 of the housing 80 is smaller in diameter than the main body portion of the housing 80 to provide a circumferential shoulder 81. The bearing housing 80 is supported by the shoulder 81 on the base plate 74 and has a plurality of keys or splines 82 cooperating with complementary slots 84 in the plate 74 to prevent the housing 80 from turning. A suitable thrust bearing 86 is provided in the housing 80 in contact with a circumferential shoulder 88 on the shaft 38 to absorb any thrust which may be imposed on the shaft 38 during rotation. A lubrication seal 90 is provided around the shaft 38 above the bearing unit 86, and is held in position by a packing nut 92 threadedly secured in the housing 80. A nut 94 is provided on the lower end of the shaft 38 to maintain the housing 80 in assembly on the shaft 38 when the shaft is moved vertically out of the strainer 2.

The upper end 95 of the shaft 38 is rotatably disposed in a housing 96 depending from a support plate 98. The housing 96 may be provided with a suitable roller bearing unit (not shown) around the shaft 38 if desired. The plate 98 is secured to a pair of channels 100 provided in the lower portion of the cap 16. It will be apparent that when the cap 16 is removed, the power wheel 26 may be moved vertically off of the shaft 38 and out of the body 4 to provide access to the basket 48.

The strainer 2 may be provided with suitable spaced leg members 102 to support the unit on the ground or the like.

*Operation*

The strainer unit 2 is adapted to be placed in a flow line (not shown), and as a practical operation, usually two units are placed in parallel relationship so that one may be isolated and cleaned, yet providing continued operation of the other without any stoppage of the flow line. The parallel arrangement is thought to be apparent and is not shown. The pipe 22 is of a reduced size and connects with a reduction nipple (not shown) with the main flow line at the point adjacent the position of the strainers in the line. In normal operation, the fluid flowing through the nozzle 22 contacts the vanes 34 to cause a rotation or rotary movement of the power wheel 26, it being understood that any debris such as leaves, sand, gravel, and the like, will fall through the cut away lower plate 30 into the strainer basket 48. Rotation of the power wheel 26 causes a simultaneous rotation of the shaft 38, arms 44, and brushes 46. The brushes 46 engage the inner surface of the strainer basket 48. It will thus be seen that the rotating brushes 46 sweep the inner wall of the basket 48 continuously, and particularly that portion of the basket wall adjacent the outlet nozzle 24, in order that the portion of the screen or basket 48 is prevented from plugging or clogging.

The use of the smaller diameter nozzle 22 provides an increased velocity for the operation of the power wheel 26 and consequently an increased velocity for the shaft 38 and the brushes 46. Since the strainer body 4 is of a greater diameter than the inlet and outlet nozzles, the fluid velocity in the body is usually less than that of the main flow line. As the fluid is discharged into the housing or body 4, the velocity decreases and permits the heavier debris such as sand, gravel and the like, to gravitate to the bottom of the strainer; however, some debris such as leaves and sticks will have buoyant characteristics and remain in suspension in the fluid in the area of the outlet nozzle 24. The increased velocity provided for the shaft 38 and the brushes 46 is such as to rotate the brushes 46 continuously in order to sweep the screen 48 free of any suspended debris and prevent any clogging thereby.

As long as fluid is discharged into the strainer 2, the brushes 46 will clean the strainer at a point adjacent the outlet nozzle 24 to prevent clogging; however, as soon as the basket 48 is substantially filled with debris, as can usually be determined by a pressure condition in the flow line, the inlet fluid is shut off by any suitable valve means (not shown) in the main flow line communicating with the inlet nozzle 22 (it being understood that in dual operation, the flow may be by-passed through a duplicate strainer). With the flow shut off, the housing 4 is relieved of fluid through the drain line 8. The cap or cover 16 is then removed from the housing for a subsequent removal of the power wheel 26 and shaft 38. In this manner, the basket 48 then may be removed from the supporting brackets 66 out of the housing 4 and dumped of any debris or the like that is present therein. Furthermore, the brushes 46 may be cleaned. After dumping and cleaning, the basket is reinserted in the housing and set in proper position by the key nibs 56 in order to be supported therein by the brackets 66. The shaft 38 is likewise reinserted with the brushes 46, the lower bearing housing 80 being inserted in the proper position in the base plate 74 as previously set forth. The power wheel 26 is then reinserted in the housing 4 on the shaft 38 and the cover 16 is again connected to the housing, and the strainer unit is ready for operation.

From the foregoing, it is apparent that the present invention contemplates a pipe line strainer adapted to be interposed in a flow line for catching debris and the like flowing therein to prevent possible contact with pumps or turbines communicating therewith. The strainer contemplates a removable perforated cylindrical member adapted to catch or trap all debris of a predetermined size therein and prevent further flow through the line. The unit contemplates an increased velocity of inlet fluid in order to assist the flow of the debris immediately to the bottom of the strainer, while simultaneously rotating a power wheel, which in turn actuates a plurality of brushes in a sweeping rotary path against the inner periphery of the strainer basket and more particularly at a point adjacent the outlet nozzle for the fluid in order to clean this portion of the basket and prevent clogging thereof. The strainer unit further contemplates an apparatus which may be relieved of pressure and permit removal of the strainer basket for emptying the trapped debris, as well as cleaning of the brushes and other elements. It is preferable to maintain the strainer units in a dual parallel relationship in the flow line, so that one unit may be shut off and cleaned simultaneously with a continuing operation of the flow line through the other unit.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A pipe line strainer unit, comprising a cylindrical housing having fluid inlets and outlets, a perforated strainer basket removably supported in the housing, a removable cover on the upper end of the housing, a plain bearing carried in the cover, a shaft extending through the basket and into the plain bearing, a power wheel keyed on the shaft above the basket and adjacent the fluid inlet to rotate the shaft, a plurality of brushes carried by the shaft for sweeping the inner periphery of the basket upon rotation of the shaft, a bearing housing telescopically disposed on the lower end of the shaft, stop means on the lower end of the shaft to preclude inadvertent removal of the bearing housing, a downwardly facing shoulder on the shaft disposed within the bearing housing, a bearing unit between said shoulder and the bearing housing to facilitate rotation of the shaft, and a spider in the lower portion of the cylindrical housing to removably receive the bearing housing, said bearing housing and spider having complementary grooves and flanges to preclude rotation of the bearing housing during rotation of the shaft.

AINSLIE PERRAULT.

References Cited in the file of this patent

UNITED STATES PATENTS

| Number | Name | Date |
|---|---|---|
| 5,404 | Watson | Dec. 28, 1847 |
| 192,103 | Watson | June 19, 1877 |
| 192,313 | Watson | June 19, 1877 |
| 336,425 | Ockershausen | Feb. 16, 1886 |
| 554,312 | Robinson | Feb. 11, 1896 |
| 580,561 | Stephenson | Apr. 13, 1897 |
| 1,510,863 | Rose | Oct. 7, 1924 |
| 1,741,444 | Slider et al. | Dec. 31, 1929 |
| 2,125,532 | Wells | Aug. 2, 1938 |
| 2,408,741 | Dodge | Oct. 8, 1946 |
| 2,440,384 | Schenke | Apr. 27, 1948 |
| 2,553,567 | Fette | May 22, 1951 |

FOREIGN PATENTS

| Number | Country | Date |
|---|---|---|
| 215,550 | Germany | Nov. 1, 1909 |